O. H. PASCHKE.
AUTOMATIC SAFETY LOCK DEVICE.
APPLICATION FILED JAN. 3, 1921.
1,419,469. Patented June 13, 1922.
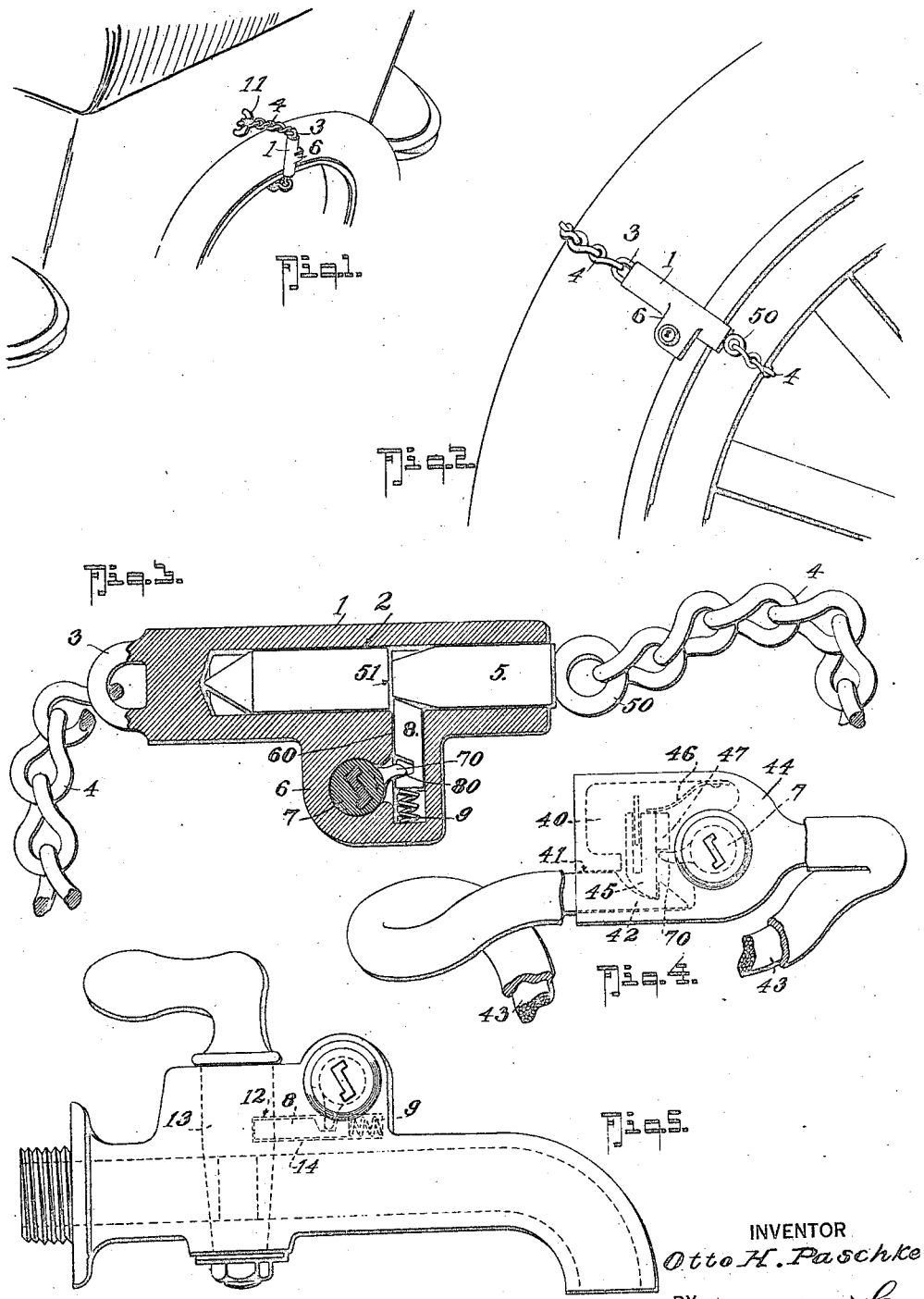
INVENTOR
Otto H. Paschke
BY
Fred J. Dieterich & Co.
ATTORNEYS

UNITED STATES PATENT OFFICE.

OTTO H. PASCHKE, OF YAKIMA, WASHINGTON, ASSIGNOR TO AUTOMATIC TRUCK BRAKE COMPANY, OF YAKIMA, WASHINGTON, A CORPORATION.

AUTOMATIC SAFETY LOCK DEVICE.

1,419,469.           Specification of Letters Patent.    Patented June 13, 1922.

Application filed January 3, 1921. Serial No. 434,614.

*To all whom it may concern:*

Be it known that I, OTTO H. PASCHKE, a citizen of the United States, residing at Yakima, in the county of Yakima and State of Washington, have invented a new and Improved Automatic Safety Lock Device, of which the following is a specification.

My present invention has for its purpose to provide a safety lock device that is more especially adapted for use in connection with wheels and tires of automobiles to prevent theft and as a lock for connection with valves used with fuel feed pipes to carbureters of automobiles and the ordinary types of faucets that control the flow of city water, gas, steam or air passages or conduits and my said invention has for its purpose to provide a lock device of the general character stated of a simple and inexpensive construction, of few parts, and which are so designed whereby they may be readily arranged for cooperation with the detent of any of the standard cylinder lock mechanism.

With the above and other objects in view, my present invention embodies the peculiar features of construction and novel arrangement of parts set forth in the following detailed description, specifically stated in the appended claims and illustrated in the accompanying drawing, in which:

Figure 1 is a perspective view of my lock device, so much of an auto body and a tire being illustrated necessary to disclose a practical application of the said device.

Figure 2 is a side elevation of my safety lock device applied around a wheel rim.

Figure 3 is a longitudinal section of the lock device, the parts being in their locked connection.

Figure 4 is a side elevation which illustrates a somewhat modified form of my invention shown in Figures 1 to 3.

Fig. 5 is a view of a faucet equipped with a lock hereinafter described.

My present invention refers more particularly to that type of safety lock device disclosed in my copending application filed April 13, 1920, Serial No. 373,664, and it especially comprehends certain details of construction of the lock device shown in my aforesaid copending application, whereby the said device is particularly adapted for use in connection with automobiles and faucets, as before mentioned.

When particularly adapted as an anti-theft lock device, for use on automobiles, the casing is an elongated body 1 having a longitudinal socket 2, which extends through one end to near the other end, as shown.

At the solid end, the casing body has an eye 3 with which connects one end of a chain 4, the length of which is dependent upon whether the device is intended for use as an anti-theft lock for a tire or for a wheel, the other or free end of the said chain connecting with a link 50 on the head portion of a locking plug 5, the purpose of which will presently appear.

About midway its length, the casing 1 has a lateral extension 6 into which is received a key actuated lock 7, of the cylinder type, whose detent 70 is adapted, when the key of the lock is turned in the direction of the arrow, to engage a shouldered projection 80 on a locking or plunger bolt 8 that works in a bore 60, which extends through the outer edge of the lateral extension and through which the said member 8 is inserted, when assembling the parts.

The plunger member 8 is held normally projected to its plug engaged position by a stout coil spring 9, which latter is held in place within the bore 60 by a closure cap that is tightly secured in place, in any approved manner, after the parts have been assembled to their operative condition.

The plug 5, before mentioned, has an annular groove or shoulder 51 for the reception of the engaging end of the plunger 8 that is spring held for engagement therewith.

When arranged so far as described and shown in Figures 1 and 3, the manner of use and the application of my invention is readily apparent, since to operatively apply the same, either for locking a tire or a wheel to the vehicle body, it is only necessary to draw the free end of the chain through a keeper 11 on the vehicle body and around the wheel or tire, the insertion of the plug 5 into the casing socket effecting an automatic locking of the said plug within the casing when the shoulder or groove 51 passes over the plunger member 8.

To release the device, the parts are unlocked on the insertion of the key and by proper turning of the lock so its detent 70 engages the projection 80 on the plunger 8 to withdraw it against the tension of its engaged spring and free engagement with the plug 5.

In Figure 4 is shown a somewhat modified construction of my invention, which form is also especially designed as an anti-theft device for connection with tires and wheels.

In its modified form instead of using a plug member and forming the casing with a long bore as in the form shown in Figures 1, 2 and 3, the casing is chambered, as at 40, and it has a square slot 41 in the front end for the ready insertion of the hook member 42 secured on one end of the flexible connection, which is shown as a leather covered cable or chain 43, the leather covering preventing chafing of the parts of the vehicle with which the connection may be engaged.

At the other end, the flexible connection is joined, in any suitable manner, with the casing 44, the latter having a reduced extension for readily joining with the flexible member.

The hook member 42, when it is inserted through the casing slot 41, automatically interlocks with a plunger detent 45 that is normally projected to the locking position by a spring 46 and provided with a heel 47 for being engaged by the detent 70 of the lock member 7, as shown.

In Figure 5, I have shown my device applied to a faucet or valve of the conventional type used in connection with water, gas, and air distributing systems.

In this latter application of my invention, the same general arrangement of the parts is shown as in Figures 1, 2 and 3. In the latter application of my invention, the faucet valve 13 has a lock notch 12 in line with the socket 14 in the casing 1 and which, when the device is applied on the faucet 5, registers with a notch 12 in the faucet casing into which the plunger or locking member 8 is projected by its spring 9.

From the foregoing description taken in connection with the drawings, the complete construction, the manner of operation and the advantages of my present form of safety lock device, will be readily apparent to those familiar with the handling of anti-theft and similar devices for the same purpose for which my invention is particularly adapted.

In the form shown in Figure 1, the plunger bolt 5, owing to the annular groove formed therein, with which the latch bolt 8 engages, being rotatably mounted within the casing 1, the said plunger bolt 5 acts as a swivel to take the kinks out of the chain and keep it from twisting and breaking the lock, and should any one undertake to smash the lock, the bolt 8 would simply rivet or mesh into the groove of the plunger bolt 5 and thereby make it impossible to open the lock.

In the faucet arrangement of my invention, the faucet may be cut off by turning the lever one way, when not desiring to lock, and by turning it in the opposite way, it locks automatically as desired.

What I claim is:

A safety lock device for the purposes described comprising a casing having a longitudinal socket, a locking plug insertable into the socket and having a locking notch, the said casing having a bore disposed at right angles to the plug receiving socket and in communication with the said socket and another bore disposed at right angles to the plunger receiving socket and the bolt bore and having a lateral passage in communication, at one side, with the bolt bore, a locking bolt in the bore with its axis normal to a plane containing the axes of the said longitudinal socket and said first mentioned bore that communicates with the lock plug receiving socket, a key worked locking element rotatably mounted in the bore having the lateral passage and including a radial member that projects through the lateral passage and constantly engages the locking bolt and a spring tending to normally project the locking end of the bolt in the path of the locking plug when the latter is inserted into the locking socket.

OTTO H. PASCHKE.